United States Patent
Deng et al.

(10) Patent No.: US 10,926,750 B2
(45) Date of Patent: Feb. 23, 2021

(54) SERVO BRAKE CYLINDER FOR DISTRIBUTED COMPOUND BRAKE SYSTEM AND SUCH BRAKE SYSTEM AND METHOD OF OPERATING THE SAME

(71) Applicant: NANJING JWD AUTOMOTIVE TECHNOLOGY CO., LTD., Nanjing (CN)

(72) Inventors: Weiwen Deng, Irvine, CA (US); Nenggen Ding, Beijing (CN)

( * ) Notice: Subject to any disclaimer, the term of this patent is extended or adjusted under 35 U.S.C. 154(b) by 55 days.

(21) Appl. No.: 16/278,055

(22) Filed: Feb. 16, 2019

(65) Prior Publication Data
US 2020/0262408 A1   Aug. 20, 2020

(51) Int. Cl.
*B60T 13/74*   (2006.01)
*F15B 15/04*   (2006.01)
*F15B 15/14*   (2006.01)

(52) U.S. Cl.
CPC ............ *B60T 13/745* (2013.01); *F15B 15/04* (2013.01); *F15B 2015/1495* (2013.01)

(58) Field of Classification Search
CPC ........ B60T 13/745; F16D 65/14; F15B 15/04; F15B 2015/1495
See application file for complete search history.

(56) References Cited

U.S. PATENT DOCUMENTS 5,758,930 A  *  6/1998  Schiel ..................... B60T 7/042
                                                    188/358
7,780,246 B2 *  8/2010  Hatano .................... B60T 8/00
                                                    303/115.2

FOREIGN PATENT DOCUMENTS

CN   108443368   *   8/2018   ............. F16D 65/14
CN   208268271   *  12/2018   ............. F16D 65/14

* cited by examiner

*Primary Examiner* — Xuan Lan Nguyen
(74) *Attorney, Agent, or Firm* — William C. Lin, PLC

(57) ABSTRACT

A servo brake cylinder for a distributed brake system with an electric motor, a ball screw assembly with a lead screw and a nut, a piston, a cylinder body is disclosed. The electric motor is connected to the ball screw assembly. The piston is installed in the hollow inner space of the cylinder body, slidable axially. The piston has a hole at the center formed by three sections of surfaces including a first cone surface, a cylindrical surface a second cone surface. One end of the lead screw is connected with the nut, and the other end at the tip of the lead screw has three sections of surfaces including a gradually constricting cone surface from the tip followed by a cylindrical surface, further followed by a gradually expanding cone surface. These surface sections at the lead screw and the three sections of the surfaces at the hole of the piston form an inlet valve and an outlet valve between the piston and the lead screw.

6 Claims, 4 Drawing Sheets

SERVO BRAKE CYLINDER FOR DISTRIBUTED COMPOUND BRAKE SYSTEM AND SUCH BRAKE SYSTEM AND METHOD OF OPERATING THE SAME

FIELD

The present invention relates to automotive brake system and operation, and more particularly to a brake system with distributed servo brake cylinders.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In recent years the intelligent vehicles have been attracting the unprecedented attention as never before. The major automotive production countries in the world, even those countries without automotive industry, take intelligent driving and vehicle networking as strategic goal to achieve with planning and support. According to the classification by the international automotive society, intelligent driving is defined with five levels, that is, driver assistance (level 1), partial automation (level 2), conditional automation (level 3), high automation (level 4) and full automation (level 5). As far as brake system is concerned, all levels of intelligent driving require active braking function in the automobile, that is, the vehicle should be able to perform partial or full braking function without driver's operation on the brake. At present, the active braking equipment includes electro-hydraulic brake (EHB), electromechanical brake (EMB), the hydraulic control unit of electronic stability control (ESC) system, and other types of electro-hydraulic servo brake systems.

EHB usually employs a high-pressure reservoir as energy source, and the pressure is generated by an electro-hydraulic pump to perform active braking when so needed. During the braking action the brake fluid in the high-pressure reservoir is directed into the master cylinder to push the piston, or is directed into the wheel cylinder directly to regulate the brake pressure at the wheel cylinder via a control device. This system may employ a pedal travel emulator to provide the pedal feel (or the so-called "road feel") for the driver, and can be backed up by manual operation. When EHB fails, the manual back-up hydraulic brake system may be used. However, due to the need of high-pressure reservoir and additional back-up hydraulic system, the construction of such type of brake system is less than concise. While the high-pressure reservoir is capable of building pressure in a short period of time to result in a short braking distance, its potential pressure leakage during a collision accident may threaten safety of the occupants. Furthermore, the electric motor equipped for the high-pressure reservoir pump needs to work frequently, such operation may have adverse effect to system life.

EMB system has its mechanism located around each wheel, and is considered a distributed brake system. The distributed brake system possesses various advantages and is considered a direction of the next-generation brake system development. Due to the fact that the braking force at each wheel may be independently regulated, the distributed brake system has advantages in operation agility and control accuracy. Because the operating mechanisms are located close to the wheel, the distributed brake system has superior dynamic response. Compared with the traditional 2-channel brake system, the distributed brake system can be regarded as a 4-channel system with enhanced system reliability. In EMB operation, electric motor is operated to produce torque, and a brake pad is directly applied to brake rotor to produce vehicle braking force via speed reduction and torque increase of the electric motor torque via a control device. Therefore, in the EMB operation brake fluid and tubing for hydraulic circuit are not required. EMB system possesses advantages in fast initial pressure build-up and fast dynamic response, even faster than EHB where hydraulic pressure is generated via pressure pump. However, such system requires complicated mechanical construction to deliver braking force; as a result, its fail-safe reliability may be considered questionable albeit its fast response is appreciated. In addition, once EMB is adopted into vehicle system design, many conventional available brake system parts may not be compatible and new brake components need to be developed, thus resulting in an increased manufacturing cost. As a result, EMB has not been deployed to many production vehicles as of date.

While vehicles equipped with traction control system (TCS) and electronic stability control (ESC) with differential braking may perform active braking via its hydraulic control unit (HCU), the much longer pressure build-up time and limitation on the electromagnetic valves unsuitable for extended period of operation make these systems difficult to meet the requirements of active braking for intelligent vehicles. In addition, the use of piston pump for active braking in these types of hydraulic pressure control unit creates another disadvantage in higher operating noise.

There are other electro-hydraulic servo brake systems for active braking, one example is a Chinese patent CN203753122U disclosing an active hydraulic brake system for intelligent vehicles. In this system there is a set of additional electromagnetic valves (EM valve set) located between the brake master cylinder and the ESC HCU operated according to brake control computation. With such additional EM valve set the brake can be operated with and without driver with a switchable operating mode. However, due to excessively long brake line this system is unsuitable for fast build-up of brake pressure resulting in slower brake response. In addition, as such construction does not support slow pressure reduction under active braking mode, the EM valve set cannot perform pressure regulation to follow a desired pressure profile. As a result, such brake system suffers poor accuracy in pressure regulation resulting in poor vehicle motion smoothness in active braking.

In addition to the above-mentioned EMB there are also other types of distributed brake systems. One example is a Chinese patent publication CN102700538A where a distributed brake system with electronic control of hydraulic pressure is disclosed. The construction of this system includes four sets of distributed electromagnetic valve and pedal travel emulator capable of performing manual back-up brake function. When braking mechanism at all wheels fails to provide active brake pressure, all electromagnetic valves keep in un-powered condition, and the driver may then manually apply the brake. When part of the braking mechanism fails resulting in braking failure at certain wheels, the system may re-construct the braking mode to provide braking function to the whole vehicle. Under normal operation, the brake is operated in by-wire mode, and the brake pedal feel is provided by the pedal travel emulator. However, this system does have disadvantages in employment of many sets of electromagnetic valves with complicated configuration and higher cost; and the pedal feel in normal driving operation is not as good as normal vehicle because the brake is operated in by-wire mode with pedal travel emulator.

Therefore, one objective of this invention is to provide a servo brake cylinder for a distributed brake system to resolve the various technological issues mentioned above. Another objective of this invention is to propose a distributed brake system utilizing the servo brake cylinder. Yet another objective of this invention is to propose a method of operating the distributed brake system based on the servo brake cylinder so as to provide solutions to the various issues in active braking of autonomous driving such as conciseness in brake system configuration, slow braking response, low brake pressure control accuracy, high manufacturing cost and insufficient fail-safe capability.

SUMMARY

A servo brake cylinder for a distributed brake system is disclosed. This servo brake cylinder includes a housing, an electric motor, a coupler and a ball screw assembly. This servo brake cylinder also has a nut, a lead screw, a bearing, a retaining ring, a piston, a cylinder body and a return spring.

In the servo brake cylinder of the present invention, the inner part of the housing has a hollow cylindrical-shape structure. This hollow cylindrical-shape structure has a first cylindrical surface, a second cylindrical surface and a third cylindrical surface. Among these surfaces the radius of second cylindrical surface is greater than that of the first cylindrical surface, and the radius of the third cylindrical surface is greater than that of the second cylindrical surface. The first cylindrical surface further includes an inlet port. An inner wall between the first cylindrical surface and the second cylindrical surface extends inwards in radial direction to form a first protrusion part.

Inside the servo brake cylinder housing, at the joining surface between the third cylindrical surface and the second cylindrical surface a shoulder is formed. There is also a retaining ring installed on the third cylindrical surface. The housing includes a second protrusion part near the front-end surface of the housing, The electric motor is installed at the right end surface of the servo brake cylinder housing. Inside the servo brake cylinder housing the ball screw assembly is borne by a set of two bearings. The output shaft of the electric motor is connected to the ball screw assembly via a coupler. The two bearings are positioned axially inside the servo brake cylinder housing by the shoulder and retaining ring.

The servo brake cylinder has a cylinder body. The cylinder body is cylindrical in shape in general. The cylinder body has a hollow inside space with an opening at the right end surface. The second protrusion part of the servo brake cylinder housing tightly joins the cylinder body at the right end surface of the cylinder body with a sealing ring. The cylinder body also includes an outlet port near the left end surface at the bottom of cylinder body.

The servo brake cylinder also includes a piston. The piston is installed in the hollow inside space of the cylinder body. The piston is installed inside the cylinder body in such way that the piston is capable of sliding along the axis of the servo brake cylinder. The piston also includes a ring slot, and a one-way sealing cup is installed at the ring slot.

The piston of the servo brake cylinder has a hole at the center. The hole is formed by three consecutive sections of surfaces. These three sections of surfaces include a first cone surface with gradually reducing radius, a cylindrical surface and a second cone surface with gradually increasing radius.

The piston of the servo brake cylinder also has a left end surface and a right end surface. The left end surface of the piston forms an outlet chamber with the inside surface of the cylinder body. The right end surface of the piston presses against a left end surface of the housing under a pre-load pressure produced by the return spring.

The servo brake cylinder also includes a ball screw assembly. The ball screw assembly has a lead screw. The lead screw is placed through two holes, first through the hole formed by the first protrusion part of the servo brake cylinder housing, and then through the hole formed by cylindrical surface of the piston. At the left end of the lead screw there are three consecutive sections of surfaces. These three sections of surfaces include a third cone surface with a gradually constricting surface, then a cylindrical surface, and then a fourth cone surface with a gradually expanding surface. The fourth cone surface of the lead screw jointly forms an outlet valve with the first cone surface of the piston. The third cone surface of the lead screw jointly forms an inlet valve with the second cone surface of the piston.

The servo brake cylinder also includes a return spring. The return spring is installed inside the left end of the cylinder body pressing against the left end surface of the lead screw. As a result, the return spring has a pre-load force to close the outlet valve and causes the piston to press against the left end surface of the servo brake cylinder housing inside the cylinder body.

The piston of the servo brake cylinder has a right end surface. The right end surface of the piston jointly forms an inlet chamber with the first cylindrical surface and the left end surface of the first protrusion part of the servo brake cylinder housing, together with the outer surface of the lead screw.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

---

Figure 1:
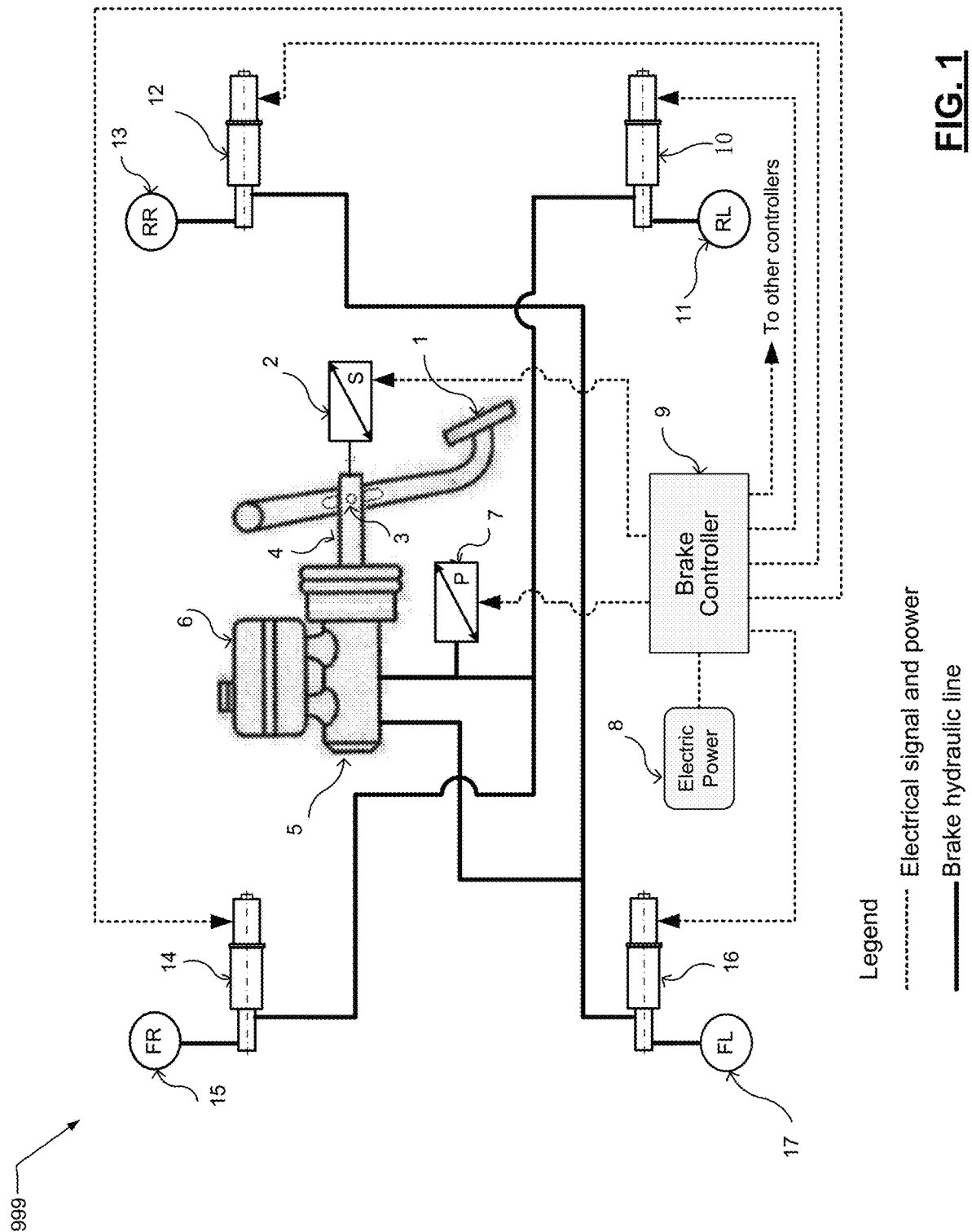
FIG. 1 is a schematic diagram of a distributed compound brake system with servo brake cylinder according to the present invention, where the light dashed lines represent signal and electric lines and the heavy solid lines represent brake lines.

| The reference numbers in the Figures are listed below | |
|---|---|
| 1 - Brake pedal | 2 - Pedal travel sensor |
| 3 - Support pin | 4 - Pushrod |
| 5 - Master cylinder | 6 - Reservoir |
| 7 - Master cylinder pressure sensor | 8 - Electric power |

-continued

The reference numbers in the Figures are listed below

| | |
|---|---|
| 9 - Brake controller | 10 - Left rear servo brake cylinder |
| 11 - Left rear wheel cylinder | 12 - Right rear servo brake cylinder |
| 13 - Right rear wheel cylinder | 14 - Right front servo brake cylinder |
| 15 - Right front wheel cylinder | 16 - Left front servo brake cylinder |
| 17 - Left front wheel cylinder | 100 - Servo brake cylinder |
| 101 - Electric motor | 102 - Coupler |
| 103 - Retaining ring | 104 - Nut |
| 105 - Bearing | 106 - Lead screw |
| 107 - O-ring | 108 - Inlet port |
| 109 - Inlet chamber | 110 - Guide pin |
| 111 - Sealing ring | 112 - Cup |
| 113 - Piston | 114 - Outlet port |
| 115 - Return spring | 116 - Outlet chamber |
| 117 - Cylinder body | 118 - Housing |
| 119 - Ball | 120 - Ball screw assembly |
| 121 - First cylindrical surface | 122 - Second cylindrical surface |
| 123 - Third cylindrical surface | 124 - First protrusion part |
| 125 - Shoulder | 126 - Second protrusion part |
| 127 - Guide slot | 128 - First cone surface |
| 129 - Cylindrical surface (of piston) | 130 - Second cone surface |
| 131 - Third cone surface | 132 - Cylindrical surface (of lead screw) |
| 133 - Fourth cone surface | 134 - Ring slot |
| 135 - Front end surface | 136 - Back end surface |
| V1 - Inlet valve | V2 - Outlet valve |

DETAILED DESCRIPTION

The following description is merely exemplary in nature and is in no way intended to limit the disclosure, its application, or uses. For purposes of clarity, the same reference numbers with or without a single or multiple prime symbols appended thereto will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure unless otherwise specified.

The servo brake cylinder that may be used in a distributed compound brake system according to the present invention, the brake system based thereon and method of operating the same will be described in the following paragraphs of this detailed description.

Referring to FIG. 1 a distributed compound brake system 999 with servo brake cylinder according to the present invention is shown. This brake system may include a brake pedal 1, a pedal travel sensor 2, a support pin 3, a pushrod 4, a master cylinder 5, a reservoir 6, a master cylinder pressure sensor 7, a electric power 8, a brake controller 9, a left rear servo brake cylinder 10, a left rear wheel cylinder 11, a right rear servo brake cylinder 12, a right rear wheel cylinder 13, a right front servo brake cylinder 14, a right front wheel cylinder 15, a left front servo brake cylinder 16, a left front wheel cylinder 17 and brake lines, signal lines and electric lines. The master cylinder 5 may be a series dual chamber brake cylinder having a front chamber and a rear chamber. The left rear servo brake cylinder 10, right rear servo brake cylinder 12, right front servo brake cylinder 14 and left front servo brake cylinder 16 each has the same configuration as described in FIG. 2, which may include an electric motor 101, a coupler 102, a retaining ring 103, a nut 104, a bearing 105, a lead screw 106, an O-ring 107, a guide pin 110, a sealing ring 111, a cup 112, a piston 113, a return spring 115, a cylinder body 117 and a housing 118.

The brake pedal 1 may be connected with pushrod 4 via support pin 3, the reservoir 6 may be connected with the front chamber and the rear chamber of the master cylinder 5. The front chamber of master cylinder 5 may be connected with the left front servo brake cylinder 16 and the right rear servo brake cylinder 12 via a tubular connector on its housing (not shown) and brake line. The rear chamber of master cylinder 5 may be connected with the right front servo brake cylinder 14 and the left rear servo brake cylinder 10 via a tubular connector on its housing (not shown) and brake line (usually hard tube). The left rear servo brake cylinder 10, the right rear servo brake cylinder 12, the right front servo brake cylinder 14 and the left front servo brake cylinder 16 are connected to left rear wheel cylinder 11, right rear wheel cylinder 13, right front wheel cylinder 15, left front wheel cylinder 17, respectively, via brake line (usually soft tube).

A pedal travel sensor 2 and a master cylinder pressure sensor 7 may be used to measure brake pedal travel and master cylinder pressure, respectively, and may be connected to brake controller 9 via signal lines. The brake controller 9 may be connected to electric power 8 and the motors of the several servo brake cylinders via electric line. The brake controller 9 may also be connected to other controllers (such as antilock brake control system or intelligent driving vehicle control system, not shown) via electric line as indicated in FIG. 1. The brake controller 9 may control the electric motors in the several servo brake cylinders to provide brake pressure to the corresponding wheel cylinder based on the master cylinder pressure measured by master cylinder pressure sensor 7 or based on a request from other controllers. A driver's braking request may be obtained via the master cylinder pressure sensor 7. When the master cylinder pressure sensor 7 fails, the driver's braking request may be inferred via the pedal travel sensor 2 based on a predetermined P-V characteristic of the brake system (P represents master cylinder pressure and V represents master cylinder fluid volume, the latter has a linear relationship with the brake pedal travel). With such configuration, the master cylinder pressure sensor 7 and the pedal travel sensor 2 forms redundancy for each other so as to provide enhanced reliability of the brake system.

Figure 2:
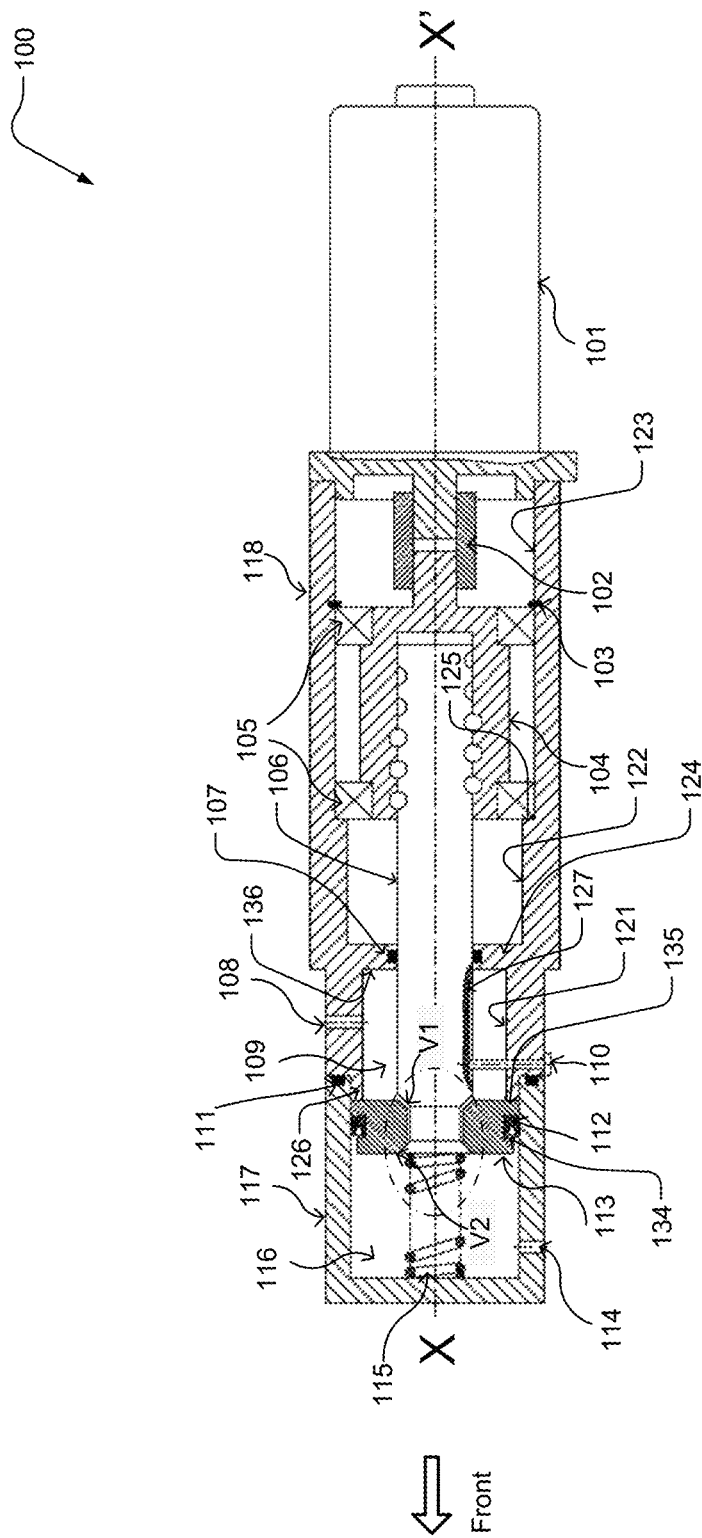
FIG. 2 is a schematic diagram showing the configuration of a servo brake cylinder according to the present invention.
Figure 2A:
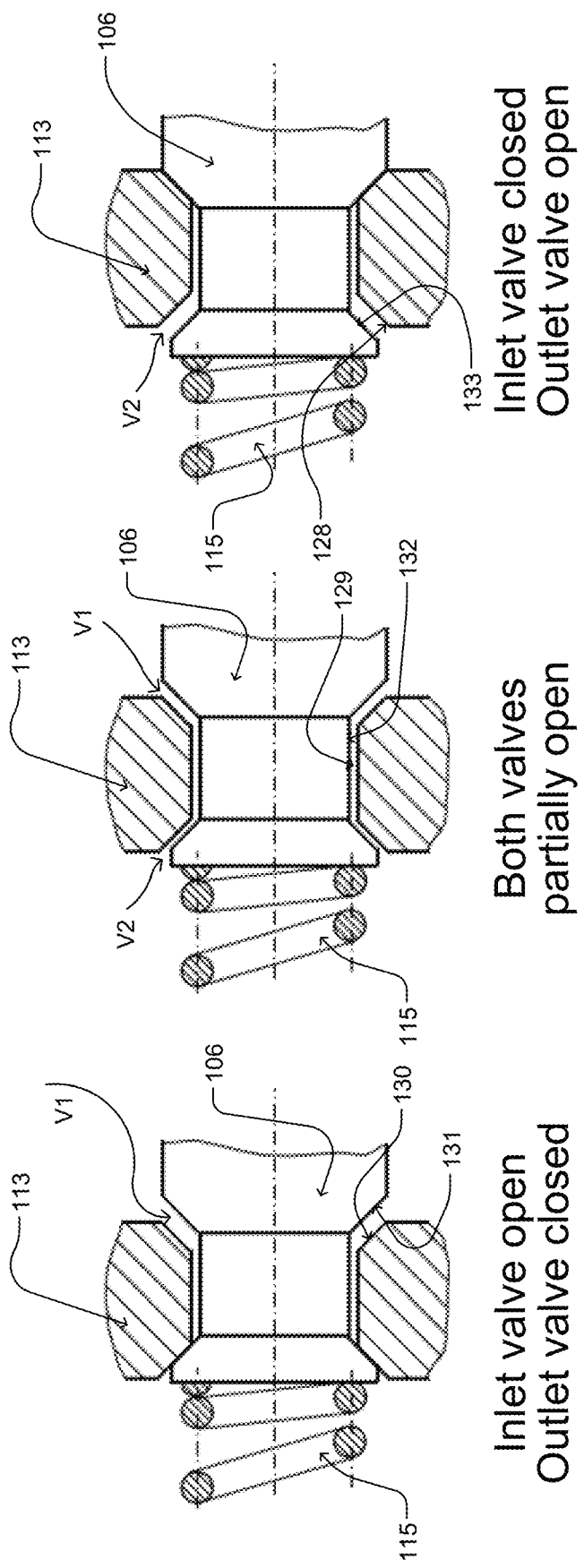
FIG. 2A shows enlarged views of part of the piston and lead screw in FIG. 2 forming valves between the two under various operating conditions.

Referring now to FIG. 2, schematic diagram of the configuration of a servo brake cylinder 100 is shown. In this disclosure, the left end of the servo brake cylinder 100 is also referred to as front end; a component of the servo brake cylinder 100 which is positioned toward left of the other component may be referred to as positioned toward front of that other component; and a linear motion of a component toward the left direction of the servo brake cylinder 100 may be referred to as motion toward the front direction of the servo brake cylinder 100. Likewise, the right end of the servo brake cylinder 100 is also referred to as rear end; a component of the servo brake cylinder 100 which is positioned toward right of the other component may be referred to as positioned toward rear of that other component; and a linear motion of a component toward the right direction of the servo brake cylinder 100 may be referred to as motion toward the rear direction of the servo brake cylinder 100.

The servo brake cylinder 100 may be one of the left rear servo brake cylinder 10, right rear servo brake cylinder 12, right front servo brake cylinder 14 or left front servo brake cylinder 16 shown in FIG. 1. In this servo brake cylinder 100, the housing 118 is configured to have a hollow chamber inside with cylindrical shape in general, which includes a first cylindrical surface 121, second cylindrical surface 122 and third cylindrical surface 123 that increases the internal diameter in succession. The first cylindrical surface 121 has a radial inlet port 108. The internal wall between first cylindrical surface 121 and second cylindrical surface 122 extends toward inside to form a first protrusion part 124. A shoulder 125 is formed where the third cylindrical surface 123 is adjacent with second cylindrical surface 122, and a retaining ring 103 is placed in the third cylindrical surface 123. At the left side of the inlet port 108 on the outside surface toward the front end of the housing 118, the surface extends axially toward front to form a second protrusion part 126.

Figure 3:
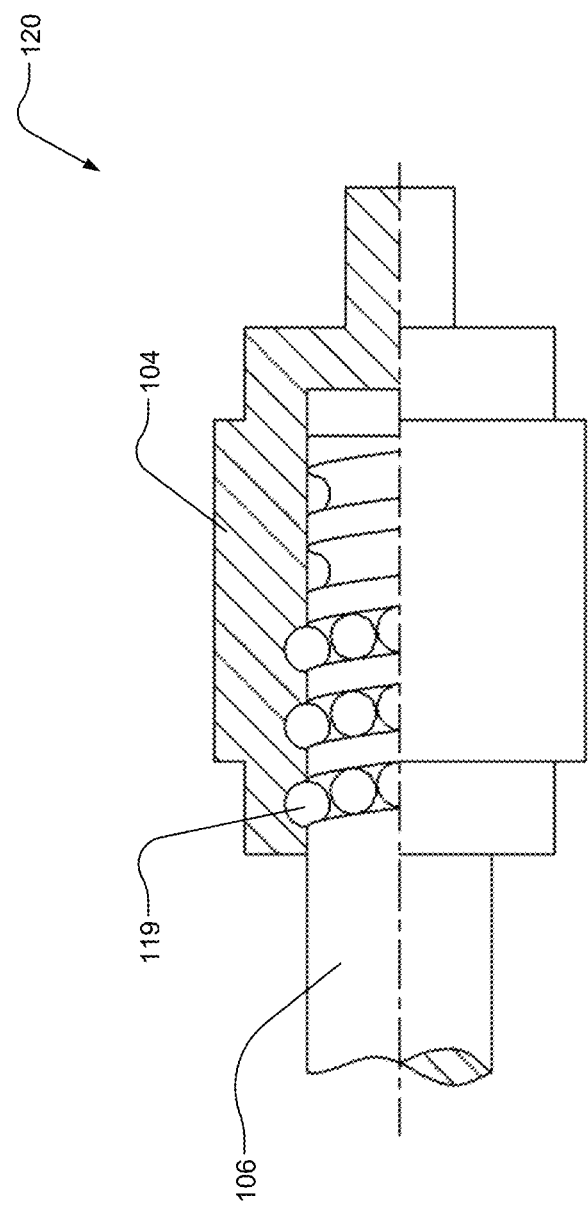
FIG. 3 is a perspective view of part of the ball screw assembly in FIG. 2.

The electric motor 101 is attached to the right end of housing 118, the motor output shaft is connected with nut 104 via coupler 102. A ball screw assembly 120, which includes a nut 104, a lead screw 106 and multiple balls 119 as illustrated in FIG. 3, is borne unto the housing 118 via a set of two bearings 105, and its axial position is fixed via the shoulder 125 inside the hollow part of the housing 118 and the retaining ring 103. The lead screw 106 includes a guide slot 127 to restrict its rotational motion via guide pin 110. As a result, the working mode of the ball screw assembly 120 is that the nut 104 rotates while the lead screw 106 moves linearly.

The center of piston 113 has hole formed by a first cone surface 128 with gradually reducing radius starting from piston front end, a cylindrical surface 129 of piston and a second cone surface 130 with gradually increasing radius. The left part of the lead screw 106 extends axially toward further left to form a third cone surface 131 with gradually reducing radius forming a gradually constricting surface, followed by a cylindrical surface 132 of lead screw and further followed by a fourth cone surface 133 with gradually increasing radius forming a gradually expanding surface terminated at the left end of the lead screw. The lead screw 106 is placed through two holes, the first hole is the one formed by the first protrusion part 124 and the second hole is the one formed at the cylindrical surface 129 of piston 113. An O-ring 107 is installed to create a sealing between the first protrusion part 124 and the lead screw 106. The first cone surface 128 of the piston and the fourth cone surface 133 of the lead screw 106 jointly form an outlet valve V2 with each other, and the second cone surface 130 of the piston 113 and the third cone surface 131 of the lead screw 106 jointly form an inlet valve V1 with each other.

Because each outer diameter of the third cone surface 131 and the fourth cone surface 133 of the lead screw 106 is larger than the diameter of the cylindrical surface 129 of the piston 113, the lead screw 106 may be formed by two separate parts and then assembled together via screw (not shown). During the assembly process, the piston 113 may be placed between the two cone-shape surfaces of the lead screw 106 before joining the two separate parts together by fastening the screw between the two.

The length of the cylindrical surface 132 of lead screw between the inlet valve V1 and outlet valve V2 may be larger than the length of the cylindrical surface 129 of the hole of the piston 113 by 0.5-1.0 millimeter.

The cylinder body 117 may have a cylindrical shape with hollow inner part and an opening toward right, and the right-end surface of the cylinder body 117 is connected with the second protrusion part 126, also well sealed with a sealing ring 111. An outlet port 114 is placed in the lower part towards the outer left-end surface of the cylinder body 117. A cup 112 that is characterized with the capability of performing one-way sealing is installed in the ring slot 134 at the outer surface of the piston 113. The cup 112 and the piston 113 are borne inside the inner hole of the cylinder body 117, and may slide together axially inside the cylinder body 117.

An outlet chamber 116 is formed by the left-end surface of piston 113 and the inner chamber of the cylinder body 117. A pre-load pressure created by the return spring 115 may exert upon one end of the lead screw 106 to close the outlet valve V2, resulting in the piston 113 resting over the front end surface 135 of the housing 118. An inlet chamber 109 is formed by the right-end surface of the piston 113, the first cylindrical surface 121 of the housing 118 and the inner end surface 136 at the first protrusion part 124.

The distributed compound brake system may be operated in three operating modes: power assist braking, active braking and manual braking upon failure. In addition, this system also supports the antilock braking functionality, in which condition the system may perform pressure regulation on the wheel cylinder pressure. The various operating modes and wheel cylinder pressure regulation of the brake system are explained below.

1. Power Assist Braking Mode:

As the driver depresses on the brake pedal 1, brake pressure in the front and rear cavities of the master cylinder 5 is created by the pedal force via pushrod 4 pushing the piston of master cylinder 5. The brake pressure in the front chamber of master cylinder 5 is distributed to the left front servo brake cylinder 16 and right rear servo brake cylinder 12 via the pressure lines; and the brake pressure in the rear chamber of master cylinder 5 is distributed to the left rear servo brake cylinder 10 and right front servo brake cylinder 14. At the beginning of the braking, the outlet valve V2 is closed due to the pre-load pressure of the return spring 115, and the piston 113 is caused to move due to the pressure inside the inlet chamber 109 coming from the master cylinder 5. The pressure inside the outlet chamber 116 is then distributed to the wheel cylinders via corresponding brake lines.

Power assist braking is realized using the four electric motors in the servo brake cylinders. The master cylinder pressure sensor 7 detects the pressure in the master cylinder and sends a signal to the brake controller 9. Based on the master cylinder pressure that reflects the driver's need of braking and a pre-determined power assist ratio of the servo brake cylinder (that is, the ratio between the output pressure by the servo brake cylinder and the output pressure by the master cylinder), the brake controller 9 computes for the target electric current at each servo brake cylinder, and drives the electric motor to work. The target current of the electric motor 101 can be operated using feedback control based on the current difference between the sampled current obtained by the brake controller 9 from the actual electric motor and the target electric current. Same or different power assist ratios may be set for the servo brake cylinders corresponding to front and rear wheels.

When the electric motor 101 participates in providing power assist, the ball screw assembly 120 converts the electric motor 101 torque to lead screw 106 thrust. As long as the thrust is large enough, it will be able to overcome the pre-load pressure of return spring 115, open the outlet valve V2 and close the inlet valve V1, and further isolate the brake fluid in the outlet chamber 116 of the servo brake cylinder from the brake fluid in the inlet chamber 109 of the servo brake cylinder. After that, the servo brake cylinder piston 113 moves due to a joint force from the inlet chamber 109 brake fluid pressure (which is the same as master cylinder brake pressure) and the lead screw 106 thrust, resulting in decrease in the volume of servo brake cylinder outlet chamber 116, thus producing a brake pressure larger than that in the master cylinder to be sent over to the corresponding wheel cylinder and providing the power assist braking.

When there is a partial failure in the control component of the brake system, the distributed compound brake system according to the present invention still can provide the power assist braking. Without loss of generality an illustration is hereby made assuming the left front servo brake cylinder 16 electric motor has failed. When such failure occurs where the electric driver circuitry ceases to function or the electric power is lost at the left front servo brake cylinder 16 of brake controller 9, the electric motor in the left front servo brake cylinder 16 will not be able to function normally. At this moment, new power assist ratios at the left rear servo brake cylinder 10, right rear servo brake cylinder 12 and right front servo brake cylinder 14 may be set to provide the vehicle with a proper overall brake power assist.

When the brake electric power 8 fails or the brake controller 9 has failure, there will be a complete loss of functionality in the power assist braking. Under this situation, the driver can still depress the brake pedal 1 to provide manual back-up braking using the distributed compound brake system according to the present invention.

2. Active Braking Mode.

When the brake controller receives the brake request, it determines the target current according to the requested pressure based on a predetermined characteristic curve of electric-motor-current versus servo brake cylinder pressure. The afore-mentioned feedback control method may be used to operate the electric motor in the corresponding servo brake cylinder to realize the target current in the electric motor. There are four operating conditions in the active braking mode: pressure increase, pressure retention, pressure decrease and pressure release, as explained below.

Pressure increase in active braking: When there is an increase in the requested pressure, the servo brake cylinder motor produces a larger torque to provide a larger thrust via the ball screw assembly 120. The lead screw thrust overcomes the force from the return spring to close the inlet valve of the servo brake cylinder. The lead screw moves together with the servo brake cylinder piston to cause reduction in the volume of the front chamber of the servo brake cylinder, resulting in a larger output of pressure to the corresponding wheel cylinder. On the other hand, during this active braking mode, the servo brake cylinder inlet chamber and master cylinder 5 as well as reservoir 6 are all in fluid communication with each other, the motion of the lead screw and the servo brake cylinder piston results in increase of the volume of the servo brake cylinder inlet chamber, thus supplying the needed brake fluid from reservoir 6 through master cylinder 5 and brake lines.

Pressure retention in active braking: When the requested pressure to the wheel cylinder is unchanged, the controller maintains the actual motor current to be the same as the target current via torque control of electric motor in the servo brake cylinder. At this moment, the servo brake cylinder motor is in a stalled condition, the servo brake cylinder piston remaining motionless and the brake pressure in corresponding wheel cylinder remaining unchanged, thus creating a state of pressure-retention. This is a state of force equilibrium. If we ignore the force of the return spring, the equivalent thrust on the servo brake cylinder piston produced by the servo brake cylinder motor is the same as the reactive force produced by the front chamber pressure of the servo brake cylinder exerting axially on the servo brake cylinder piston.

Pressure decrease in active braking: When there is a decrease in the target pressure, the servo brake cylinder electric motor torque is reduced, and so is the thrust exerting on the servo brake cylinder piston, thus reducing servo brake cylinder front chamber pressure and the corresponding wheel cylinder pressure. If there is a need of a rapid reduction of the wheel cylinder pressure, the servo brake cylinder motor may be commanded to turn in a reversed direction, the fast motion to the opposite direction in the lead screw causes the servo brake cylinder outlet valve to be closed, and also results in the servo brake cylinder moving towards the opposite direction. With the volume increased in the servo brake cylinder front chamber, the brake pressure and the corresponding wheel cylinder pressure are therefore reduced rapidly. In the process of servo brake cylinder pressure decrease, the inlet chamber volume is reduced, the excessive brake fluid flows back to reservoir 6 via brake lines and the master cylinder 5.

Pressure release in active braking: When the requested wheel cylinder pressure is reduced to zero, the controller commands the servo brake cylinder motor corresponding to the wheel cylinder to cease operation. In this case, the lead screw together with the servo brake cylinder piston moves backwards to the initial position due to the force of the return spring, thus releasing the brake pressure at the wheel cylinder. The excessive brake fluid in the servo brake cylinder inlet chamber flows back to reservoir 6 via corresponding brake line and the master cylinder 5.

3. Manual Backup Failure Mode:

When the power assist braking function completely fails for whatever reason in the brake system, manual backup braking may be exercised. In this manual backup failure mode, when the driver depresses on brake pedal 1, the pedal force pushes the piston of the master cylinder 5 via pushrod 4, brake pressure is built up in the front and rear cavities of the master cylinder 5. The pressure in the master cylinder 5 front chamber is transmitted to the inlet cavities of the left front servo brake cylinder 16 and the right rear servo brake cylinder 12, respectively, and the pressure in the master cylinder 5 rear chamber is transmitted to the inlet cavities of the left rear servo brake cylinder 10 and right front servo brake cylinder 14, respectively. Because the electric motor does not work, the cone-shape surface of the servo brake cylinder outlet valve presses upon the cone-shape surface of the piston under the force created by the pre-loaded return spring, thus isolating the servo brake cylinder inlet chamber from the outlet chamber. At this moment, the servo brake cylinder piston starts moving in the inlet chamber under the pressure coming from the master cylinder 5, the pressure produced in the outlet chamber is transmitted to the corresponding wheel cylinders via brake lines, thus providing manual backup braking.

4. Wheel Cylinder Pressure Regulation.

During the operation of power assist braking and active braking, when there is an impending wheel lock taking place, wheel cylinder pressure regulation may be performed. Based on the various needs of the wheel cylinder pressure regulation, the wheel cylinder pressure regulation may include three different working conditions of pressure increase, pressure retention and pressure decrease, as described below.

When a certain wheel cylinder needs pressure decrease, for example, the brake controller 9 receives a request for pressure decrease from an intelligent vehicle control system (or antilock braking system), commanding a reduction of torque of the electric motor of the corresponding servo brake cylinder, even to the extent of commanding the electric motor to produce a negative torque to rapidly reduce the wheel cylinder pressure. After the electric motor torque is reduced, the pressure at the servo brake cylinder and in the wheel cylinder is reduced accordingly. When there is such need of rapid pressure reduction in the wheel cylinder pressure so the electric motor needs to reverse its rotation direction, the corresponding rapid reverse motion of the lead screw will cause the servo brake cylinder outlet valve to close, and thus cause the servo brake cylinder piston to move in the reversed direction. As a result, the servo brake cylinder front chamber volume is increased, causing the corresponding wheel cylinder pressure to be decreased rapidly. Advantageously, if the driver has exerted too much pressure to the brake to potentially cause wheel lock to occur even without the brake power assist, for example, on a surface with low adhesion coefficient, the otherwise impending wheel lock may be avoided by the electric motor rotating in the reversed direction.

When there is need to perform pressure retention on the wheel cylinder, a target electric motor current is computed based on the measured master cylinder pressure and the target value of the wheel cylinder pressure. Motor torque control is performed to cause the actual electric motor current to be equal to the target electric motor current. Under this situation the servo brake cylinder motor is in a stalled condition, the servo brake cylinder piston becomes stationary so the pressure in the corresponding wheel cylinder remains unchanged, thus creating a state of pressure retention.

When there is a need for pressure increase, a target electric motor current is computed based on the measured master cylinder pressure and the instantaneous value of the target wheel cylinder pressure. Motor torque control is performed to cause the actual electric motor current to be equal to the target electric motor current, thus performing the pressure increase for the wheel cylinder pressure regulation.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A servo brake cylinder for a distributed brake system comprising a housing (118), an electric motor (101), a coupler (102), a ball screw assembly (120) further comprising a nut (104) and a lead screw (106), a bearing (105), a retaining ring (103), a piston (113), a cylinder body (117) and a return spring (115), wherein:

the inner part of said housing (118) is configured to have a hollow cylindrical-shape structure comprising a first cylindrical surface (121), a second cylindrical surface (122) and a third cylindrical surface (123) wherein the radius of the second cylindrical surface (122) is greater than that of the first cylindrical surface (121) and the radius of the third cylindrical surface (123) is greater than that of the second cylindrical surface (122), and wherein the first cylindrical surface (121) is toward front axially from the second cylindrical surface (122) and the second cylindrical surface (122) is toward front axially from the third cylindrical surface (123);

the first cylindrical surface (121) further comprises an inlet port (108); an inner wall between the first cylindrical surface (121) and the second cylindrical surface (122) extends inwards radially to form a first protrusion part (124) that forms a first center hole, and a joining surface between the third cylindrical surface (123) and the second cylindrical surface (122) forms a shoulder (125); said retaining ring (103) is installed on said third cylindrical surface (123), and the housing (118) further comprises a second protrusion part (126) near the front-end surface of the housing (118) and extending axially toward front;

the electric motor (101) is installed at the rear end surface of the housing (118), said ball screw assembly (120) is borne inside the housing (118) by a set of two bearings (105), an output shaft of the electric motor (101) is connected to the ball screw assembly (120) via the coupler (102); said bearings (105) are positioned inside the housing (118) joined to the third cylindrical surface (123) and held axially by the shoulder (125) and retaining ring (103);

the cylinder body (117) is characterized by a cylindrical-shaped structure with a hollow inside space wherein the cylindrical-shaped structure has an opening at the rear end surface; the cylinder body (117) is tightly joined with the second protrusion part (126) at the rear end surface; the cylinder body (117) further comprises an outlet port (114) near the front end of the cylindrical-shaped structure at the bottom of cylinder body (117);

the piston (113) is installed in the hollow inside space of the cylinder body (117) wherein the piston (113) is capable of sliding axially, said piston (113) further comprising a ring slot (134) where a one-way sealing cup (112) is installed, said piston (113) is configured to include a second center hole wherein the second center hole is formed by a first cone surface (128) with gradually reducing radius from front toward rear, a cylindrical surface (129) and a second cone surface (130) with gradually increasing radius from front toward rear; said piston (113) further comprising a left end surface and a right end surface wherein the left end surface of said piston (113) forming an outlet chamber (116) with the inside of the cylinder body (117), and the right end surface of said piston (113) presses against a left end surface of the housing (118) under a pre-load pressure produced by the return spring (115);

the lead screw (106) is placed through the first center hole of the first protrusion part (124) and the second center hole formed by cylindrical surface (129) of the piston (113), and has a front part that extends axially toward front to form a third cone surface (131) with a gradually constricting surface toward front, then a cylindrical surface (132) toward front, and then a fourth cone surface (133) with a gradually expanding surface wherein the fourth cone surface (133) and the first cone surface (128) jointly form an outlet valve (V2) and the third cone surface (131) and the second cone surface (130) jointly form an inlet valve (V1);

the return spring (115) is installed inside the front end of the cylinder body (117) pressing against the front end surface of the lead screw (106) thereby closing the outlet valve (V2) and causing the piston (113) to press against the front end surface of the housing (118) inside the cylinder body (117); and the piston (113) has a rear end surface that forms an inlet chamber (109) jointly with the first cylindrical surface (121) of the housing (118), the front end surface of the first protrusion part (124) and the outer surface of the lead screw (106).

2. The servo brake cylinder as in claim 1 wherein said lead screw (106) has a guide slot (127) and a guide pin (110) is installed in the housing (118) wherein said guide pin (110)

is inserted in the guide slot (127) restraining rotational motion of the lead screw (106).

3. The servo brake cylinder as in claim 2 wherein one end of said lead screw (106) further comprises a third cone surface (131), a cylindrical surface (132) and a fourth cone surface (133), and said one end of the lead screw (106) is configured to comprise two separable and connectable sections.

4. A distributed compound brake system equipped with the servo brake cylinder as in claim 3 comprising a brake pedal (1), a pedal travel sensor (2), a pushrod (4), a master cylinder (5), a reservoir (6), a master cylinder pressure sensor (7), an electric power (8), a brake controller (9) and four brake actuation mechanisms, wherein:

each one of the four brake actuation mechanisms comprises one said servo brake cylinder and a wheel cylinder connected with the servo brake cylinder via brake lines, namely, a left front servo brake cylinder (16) connected with a left front wheel cylinder (17), a left rear servo brake cylinder (10) connected with a left rear wheel cylinder (11), a right front servo brake cylinder (14) connected with a right front wheel cylinder (15) and a right rear servo brake cylinder (12) connected with a right rear wheel cylinder (13), respectively;

the reservoir (6) and the master cylinder (5) are in fluid communication with the four brake actuation mechanisms via brake line connection;

the brake controller (9) is electrically connected with the electric power (8), and is in electrical communication with the four brake actuation mechanisms;

the pedal travel sensor (2) has an input end connected with the brake pedal (1), and has an output end connected with the brake controller (9) via signal line, wherein the pedal travel sensor (2) measures a displacement of pedal travel and provides a pedal travel information to the brake controller (9); and the master cylinder pressure sensor (7) has an input end connected with the master cylinder (5), and has an output end connected with the brake controller (9) via signal line, wherein the master cylinder pressure sensor (7) measures a pressure in the master cylinder (5) and provides a pressure information to the brake controller (9).

5. A distributed compound brake system as in claim 4 with the master cylinder (5) further comprising a front chamber and a rear chamber wherein:

the front chamber is in fluid communication with the left front servo brake cylinder (16) and the right rear servo brake cylinder (12) via brake lines; and the rear chamber is in fluid communication with the right front servo brake cylinder (14) and the left rear servo brake cylinder (10) via brake lines.

6. A distributed compound brake system as in claim 5 wherein the reservoir (6) is in fluid communication with the front chamber and the rear chamber.

\* \* \* \* \*